United States Patent
Hinners et al.

(10) Patent No.: US 9,932,243 B2
(45) Date of Patent: Apr. 3, 2018

(54) CLEANING OF RESERVOIR WATER

(71) Applicant: Wintershall Holding GmbH, Kassel (DE)

(72) Inventors: Georg Hinners, Lohne (DE); Marc Poschmann, Hainfeld (DE); Gerhard Themann, Vechta (DE); Andreas Wolf, Bairoda (DE)

(73) Assignee: Wintershall Holding GmbH, Kassel (DE)

( * ) Notice: Subject to any disclaimer, the term of this patent is extended or adjusted under 35 U.S.C. 154(b) by 224 days.

(21) Appl. No.: 14/783,144

(22) PCT Filed: Mar. 28, 2014

(86) PCT No.: PCT/EP2014/056290
§ 371 (c)(1),
(2) Date: Oct. 8, 2015

(87) PCT Pub. No.: WO2014/166760
PCT Pub. Date: Oct. 16, 2014

(65) Prior Publication Data
US 2016/0046505 A1    Feb. 18, 2016

(30) Foreign Application Priority Data
Apr. 9, 2013 (EP) .................................... 13162899

(51) Int. Cl.
| B01D 19/00 | (2006.01) |
| C02F 1/20 | (2006.01) |
| B01D 3/26 | (2006.01) |
| C02F 101/32 | (2006.01) |
| C02F 103/10 | (2006.01) |

(52) U.S. Cl.
CPC .................. *C02F 1/20* (2013.01); *B01D 3/26* (2013.01); *C02F 2101/322* (2013.01); *C02F 2103/10* (2013.01)

(58) Field of Classification Search
None
See application file for complete search history.

(56) References Cited

U.S. PATENT DOCUMENTS

| 4,236,973 A | * | 12/1980 | Robbins | ................. | B01D 3/343 |
| | | | | | 203/10 |
| 4,857,198 A | * | 8/1989 | Meidl | .................... | B01D 53/84 |
| | | | | | 203/10 |
| 2014/0231345 A1 | | 8/2014 | Fuchs et al. | | |

FOREIGN PATENT DOCUMENTS

| DE | 10026135 A1 | 11/2001 | | |
| FR | 2979338 A1 | * | 3/2013 | ................ C02F 1/20 |
| FR | 2979338 A1 | | 3/2013 | |
| FR | 2979339 A1 | | 3/2013 | |

(Continued)

OTHER PUBLICATIONS

Translation of FR2979338, accessed Jul. 17, 2017.*

(Continued)

*Primary Examiner* — Amber R Orlando
*Assistant Examiner* — Phillip Shao
(74) *Attorney, Agent, or Firm* — Drinker Biddle & Reath LLP

(57) ABSTRACT

The present invention relates to a simple and improved process for removing aromatic hydrocarbons from deposit water through the use of associated petroleum gas as stripping gas.

16 Claims, 1 Drawing Sheet

(56) References Cited

FOREIGN PATENT DOCUMENTS

WO          WO 0039031 A1 *   7/2000     ............. C02F 3/344
WO    WO-2014/166760 A1    10/2014

OTHER PUBLICATIONS

International Search Report for PCT/EP2014/056290 dated Jun. 4, 2014.
Phillips et al., "Removal of Benzene from Industrial Wastewater by Vapor Stripping", Journal of Environmental Science and Health, Part A. Toxic: Hazardous Substances & Environmental Engineering, vol. 30, No. 5, pp. 1075-1090 (Jun. 1, 1995).
Waldie et al., "Removal of Dissolved Aromatics from Water", Chemical Engineering Research and Design, Part A, Institution of Chemical Engineers, vol. 76, No. 5, pp. 562-570 (Jul. 1, 1998).
"Natural Gas Background", (Jan. 1, 2011), Retrieved from the Internet: <URL:www.naturalgas.org/overview/background.asp>, [retrieved on Aug. 14, 2013].

* cited by examiner

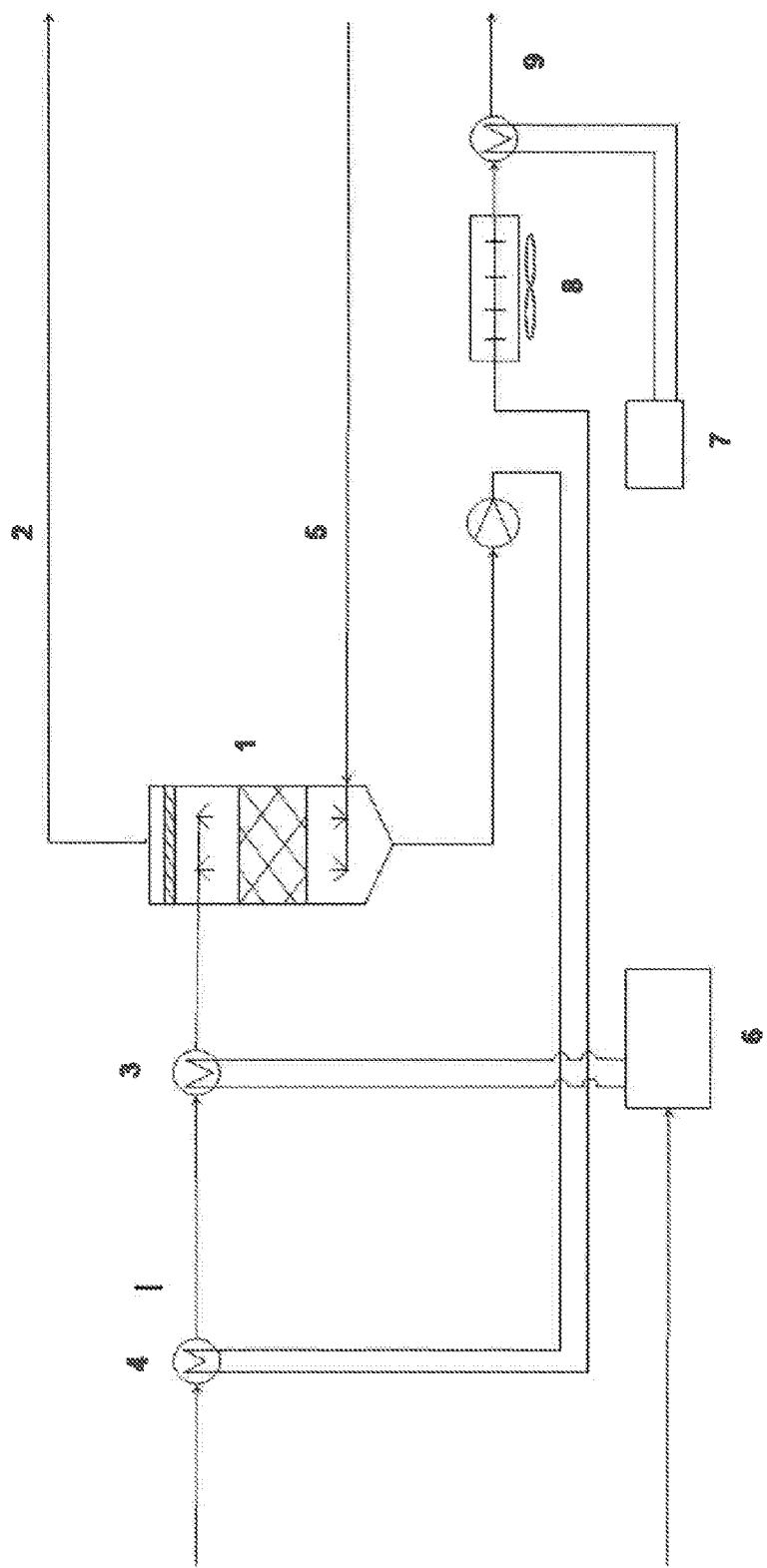

CLEANING OF RESERVOIR WATER

CROSS-REFERENCE TO RELATED APPLICATIONS

This application is a national stage application (under 35 U.S.C. §371) of PCT/EP2014/056290, filed Mar. 28, 2014, which claims benefit of European Application No. 13162899.2, filed Apr. 9, 2013, both of which are incorporated herein by reference in their entirety.

The present invention relates to a simple and improved process for removing aromatic hydrocarbons from deposit water through the use of associated petroleum gas as stripping gas.

The production of mineral oil basically involves production of a mineral oil/water mixture from the ground. In the case of newly developed oilfields, this mixture consists of the formation water already present in the mineral oil-bearing layers and the oil which is produced. In the case of older fields, for production of the mineral oil/water mixture, it is necessary to inject water into the mineral oil formations through injection wells, which are at a certain distance from the production well. As a result of the pressure built up in this way, the water flows in the mineral oil-bearing layer to the production well and carries mineral oil along with it, which is then withdrawn at the production well together with the injection water and any formation water present.

This mineral oil/water mixture then has to be separated in order to obtain crude oil suitable for further processing. The water content of the mineral oil/water mixture is different from oilfield to oilfield and also changes with advancing exploitation of the oilfield.

For separation of the mineral oil/water mixture, phase separators are generally used, i.e. the mineral oil/water mixture is transferred to a vessel in which the lighter oil and the heavy water can separate under the influence of gravity, such that an oil phase forms at the surface and a water phase (deposit water) in the lower region. In addition, the pressure reduction releases associated petroleum gas, which can be used for purposes including heating purposes.

The deposit water can again be injected into the mineral oil formation. For this purpose, the deposit water has to be transported through pipeline systems which may be manufactured from polyethylene. Field line systems for deposit water made from polyethylene are used particularly in the case of production of mineral oil from fields with narrow working corridors, since polyethylene pipelines can be laid in a simple and space-saving manner as continuous material from a drum. As well as easy processability, polyethylene pipelines likewise feature high corrosion resistance to saline deposit water.

Deposit water comprises a proportion of aromatic residual hydrocarbons in a concentration of about 1 to 10 mg/l, in exceptional cases even up to 700 mg/l, which are also referred to as BTEX aromatics (benzene, toluene, ethylbenzene, xylene). These aromatic residual hydrocarbons lead to an adverse effect on the stability of the polyethylene pipelines since they diffuse into the polyethylene matrix, albeit very gradually. In the case of use of polyethylene pipelines for transport of deposit water, the integrity thereof should therefore be ensured, since damage to the pipelines can lead to contamination of the adjoining soil and groundwater with aromatic hydrocarbons. The State Authority for Mining, Energy and Geology in Clausthal-Zellerfeld, Germany, therefore stipulated in a directive that deposit water may have a maximum concentration of 3 mg/l of BTEX aromatics if it is transported with the aid of polyethylene pipelines.

DE 100 26 135 A1 describes a process for removing hydrocarbons from the waste liquor from alkali scrubbers, wherein methane is used as stripping gas. The process is conducted at comparatively low temperatures in a tray column.

FR 2 979 339 A1 discloses a process for cleaning water laden with aromatic hydrocarbons, utilizing natural gas as stripping gas. Natural gas differs fundamentally in its composition from accompanying petroleum gas, since it has a particularly high proportion of methane (see, inter alia, safety data sheet pursuant to Regulation (EC) No. 1907/2006 (REACH), §5 GefStoffV [German Hazardous Substances Act], for natural gas, dried). The process disclosed in FR 2 979 339 A1 additionally requires a supply pressure in the stripping gas of 5 to 6 bar, the generation of which is associated with apparatus complexity and energy expenditure. The reason lies in the mode of contacting stripping medium and water: the gas is injected into a stationary water volume with substantial destruction of its compression energy. This enables the process to produce fine bubbles which are necessary for process-related reasons in order to provide a large pollutant passage area. The process does not utilize any temperature increase to promote the cleaning operation. Thus, the process disclosed in FR 2 979 339 A1 may also be referred to as a coarse removal of aromatics, the residual loading of which is one hundred times that in the process presented here.

There was therefore a need for a simple and economically viable process for removing BTEX aromatics from deposit water, which can be incorporated into the existing plant structure for mineral oil production without great construction complexity.

BRIEF DESCRIPTION OF THE DRAWING

FIG. 1 depicts a schematic representation of an exemplary plant for carrying out the instant invention.

DESCRIPTION OF THE INVENTION

It is therefore an object of the present invention to provide a simple and economically viable process for removing BTEX aromatics from deposit water, which can be integrated into the existing plant structure for mineral oil production without great construction complexity.

The abovementioned object is achieved by a process for workup of water comprising aromatic hydrocarbons selected from the group consisting of benzene, toluene, ethylbenzene and xylene, comprising at least the following steps:
 (i) introducing a stream (I) comprising water and aromatic hydrocarbons selected from the group consisting of benzene, toluene, ethylbenzene and xylene into a column,
 (ii) contacting stream (I) with a second stream (II) in countercurrent and
 (iii) removing a third stream (III) comprising water and aromatic hydrocarbons selected from the group consisting of benzene, toluene, ethylbenzene and xylene, the aromatic hydrocarbons being present in a concentration of $\leq 3$ mg/l based on the volume of stream (III),
wherein the second stream (II) comprises associated petroleum gas comprising $\geq 30\%$ by volume to $\leq 75\%$ by volume of methane.

The associated petroleum gas preferably comprises $\geq 30\%$ by volume to $\leq 65\%$ by volume of methane; more preferably, the associated petroleum gas comprises $\geq 30\%$ by volume to $\leq 60\%$ by volume of methane.

It has been found that, surprisingly, associated petroleum gas can be utilized for removal of aromatic hydrocarbons from deposit water even though it already has prior loading with aromatic hydrocarbons, such as benzene, toluene, ethylbenzene and xylene, and so the person skilled in the art would have expected the cleaning capacity of associated petroleum gas to be low.

According to geological origin and depending on the process regime in the workup, associated petroleum gas has a different composition. In general, associated petroleum gas can be used irrespective of its origin or its composition. Preferably, the associated petroleum gas comprises ≥50% by volume to ≤97% by volume of $C_1$-$C_{10}$ hydrocarbons, based on the overall composition of the associated petroleum gas, more preferably ≥70% by volume to ≤97% by volume, most preferably ≥80% by volume to ≤97% by volume.

Preferably, the $C_1$-$C_{10}$ hydrocarbons are selected from the group consisting of methane, ethane, propane, butane, pentane, hexane, heptane, octane, nonane and decane. Butane, pentane, hexane, octane, nonane and decane are each present as a mixture of the isomers thereof. In addition, the associated petroleum gas comprises aromatic hydrocarbons selected from the group consisting of benzene, toluene, ethylbenzene and xylene in an amount of ≥0.01% by volume to ≤0.1% by volume. The associated petroleum gas may additionally have constituents which do not contain carbon, for example hydrogen sulfide, carbon dioxide, nitrogen, helium and argon. Nitrogen is present in the associated petroleum gas preferably in an amount of ≥2% by volume to ≤12% by volume, more preferably in an amount of ≥2% by volume to ≤10% by volume. Carbon dioxide is present in the associated petroleum gas preferably in an amount of ≥0.5% by volume to ≤20% by volume, more preferably in an amount of ≥1% by volume to ≤15% by volume, more preferably in an amount of ≥5% by volume to ≤10% by volume. However, hydrogen sulfide, carbon dioxide, nitrogen, helium and argon are each present in such small amounts that they do not adversely affect the combustion of the associated petroleum gas.

The associated petroleum gas preferably comprises ≥50% by volume to ≤97% by volume of $C_1$-$C_6$ hydrocarbons, based on the overall composition of the associated petroleum gas, more preferably ≥70% by volume to ≤97% by volume, most preferably ≥80% by volume to ≤97% by volume. Preferably, $C_1$-$C_6$ hydrocarbons are selected from the group consisting of methane, ethane, propane, butane, pentane and hexane.

The associated petroleum gas preferably comprises
≥30% by volume to ≤65% by volume of methane,
≥5% by volume to ≤20% by volume of ethane,
≥5% by volume to ≤25% by volume of propane,
≥5% by volume to ≤25% by volume of butane,
≥1% by volume to ≤6% by volume of pentane and
≥1% by volume to ≤5% by volume of hexane.

After leaving the column, the associated petroleum gas is preferably steam-saturated.

The water used in accordance with the invention is preferably deposit water. The water, especially the deposit water, comprises aromatic hydrocarbons selected from the group consisting of benzene, toluene, ethylbenzene and xylene in a concentration of ≥2 mg/l to ≤700 mg/l, more preferably ≥2 mg/l to ≤200 mg/l, most preferably ≥2 mg/l to ≤25 mg/l, based on the volume of the water or deposit water.

The temperature of the water which is used in step (i) is preferably set to a temperature in the range of ≥40° C. to ≤80° C., more preferably in the range of ≥50° C. to ≤70° C. The treatment at elevated temperatures enables the process according to the invention to achieve enhanced cleaning performance compared to processes without any influence on this process parameter. The temperatures required by the process according to the invention correspond to those that can be provided by heating systems present in mineral oil processing facilities. In this way, it is possible to utilize plants already present in the periphery of mineral oil production, and so the process according to the invention is particularly economically viable. Since the water used in accordance with the invention is used at elevated temperatures, for example 70° C., it should be ensured that the pH is set such that no salts are formed at these temperatures. For example, the solubility of barium sulfate decreases with rising temperature. Depending on the composition of the deposit water, adjustment of the pH preferably within the range of ≥4 to ≤6.5 is required in order to prevent the precipitation of salts (scale formation).

In the process according to the invention, the first stream (I) is passed from the top through a bed or structured packing having high surface area into a column, while the second stream (II) ascends in countercurrent and is collected separately at the upper end of the column and led off to the boilers in the shuttle gas system. In this way, the liquid is introduced into the column from the top, while the associated petroleum gas flows in from the bottom.

It is possible in principle to execute the process according to the invention at any pressure, for example at a reduced pressure or at standard pressure. Preference is given to utilizing the process according to the invention at standard pressure in order to save operating costs and capital costs for the construction of the plant. As a result of the reduction in the operating pressure into the vacuum range, however, there is also an increase in the efficiency of the stripping column. Preferably, a pressure in the range from ≥200 hPa to ≤1500 hPa is present in the column, more preferably in the range of ≥300 hPa to ≤1200 hPa, most preferably in the range of ≥900 hPa to ≤1050 hPa. In the process according to the invention, it is possible to dispense with the application of elevated pressure which adversely affects the purifying operation, since there is essentially no need for a standing liquid column to be penetrated by the ascending gas. This makes the process according to the invention particularly economically viable, since it is possible to dispense with the compression of the stripping gas. The low system pressure additionally enhances the cleaning performance.

In step (iii), the cleaned water, i.e. the water having a lower concentration of aromatic hydrocarbons, is collected and pumped away. The third stream (III) preferably comprises aromatic hydrocarbons selected from the group consisting of benzene, toluene, ethylbenzene and xylene in a concentration in the range of a ≥0.1 mg/l to ≤1 mg/l, more preferably in the range of ≥0.2 mg/l to ≤1 mg/l, most preferably in the range of a ≥0.2 mg/l to ≤0.5 mg/l. It is a feature of the process according to the invention that very low concentrations of aromatic hydrocarbons can be achieved in the cleaned deposit water without any requirement for additional cleaning steps which, under some circumstances, require oxygen, as, for example, in the further biological processing of deposit water.

In a very particularly preferred embodiment, the present invention relates to a process for workup of water comprising aromatic hydrocarbons selected from the group consisting of benzene, toluene, ethylbenzene and xylene, comprising at least the following steps:
(i) introducing a stream (I) comprising water and aromatic hydrocarbons selected from the group consisting of benzene, toluene, ethylbenzene and xylene into a column, the aromatic hydrocarbons being present in a concentration in the range of a ≥2 mg/l to ≤700 mg/l, preferably in the range of a ≥2 mg/l to ≤50 mg/l, based on the volume of stream (III), (ii) contacting stream (I) with a second stream (II) in countercurrent and (iii) removing a third stream (III) comprising water and aromatic hydrocarbons selected from the group consisting of benzene, toluene, ethylbenzene and xylene, the aromatic hydrocarbons being present in a concentration in the range of a ≥0.1 mg/l to ≤1 mg/l based on the volume of stream (III), wherein the second stream (II) comprises associated petroleum gas comprising a ≥30% by volume to ≤75% by volume of methane.

In an even further-preferred embodiment, the present invention relates to a process for workup of water comprising aromatic hydrocarbons selected from the group consisting of benzene, toluene, ethylbenzene and xylene, comprising at least the following steps:

(i) introducing a stream (I) comprising water and aromatic hydrocarbons selected from the group consisting of benzene, toluene, ethylbenzene and xylene into a column, where a pressure in the range of a ≥200 hPa to ≤1500 hPa is present in the column and the aromatic hydrocarbons are present in a concentration in the range of ≥2 mg/l to ≤700 mg/l, preferably in the range of a ≥2 mg/l to ≤50 mg/l, based on the volume of stream (III), (ii) contacting stream (I) with a second stream (II) in countercurrent and (iii) removing a third stream (III) comprising water and aromatic hydrocarbons selected from the group consisting of benzene, toluene, ethylbenzene and xylene, the aromatic hydrocarbons being present in a concentration in the range of ≥0.1 mg/l to ≤1 mg/l based on the volume of stream (III), wherein the second stream (II) comprises associated petroleum gas comprising ≥30% by volume to ≤75% by volume of methane.

At the same time, the process according to the invention is capable of achieving the separation performance described in one process stage.

The process according to the invention dispenses with the introduction of oxygen. The latter is intolerable in many applications, especially in oil and gas applications, and would therefore have to be separated out again at great cost and inconvenience, since divalent iron would be oxidized to trivalent iron, which can lead to precipitation and disruption to operation.

The process according to the invention is preferably executed continuously. A continuous process in the context of this invention is a process in which the addition of the water to the column and the discharge of the water depleted of aromatic hydrocarbons from the column take place simultaneously but spatially separately. The continuous procedure is economically advantageous since plant shutdown periods are avoided.

The column is preferably a column having random packing or tray column; the column is more preferably a column having random packing.

Columns having random packing as such are suitable in principle and known to those skilled in the art. Typically, the columns having random packing used have a round, frequently symmetrical and usually circular or elliptical diameter or cross section. A column having random packing has random packing elements. Random packing elements are advantageously random packing elements having a low level of dead space and a discontinuous surface. Examples of random packing elements having a low level of dead space and discontinuous surfaces are especially cylindrical types such as Pall rings, including modified Pall rings, such as the Raflux types from Rauschert, Hiflow rings, Ralu rings from Raschig, and additionally Super-Rings from Raschig, and also spherical bodies with a discontinuous sphere surface such as Envi-Pac® bodies and the like. In general, the random packing elements are present in the column in the form of a random bed. In principle, ordered beds and/or packings of the random packing elements are also suitable. In the case of use of a column having random packing, a liquid distributor plate may be provided at a suitable height in order to improve the efficiency of gas/liquid contact.

Since the water may comprise chloride, formation of corrosion is prevented by using a corrosion-resistant steel for the production of the column. The steel preferably comprises a) 20-30% by weight of chromium, b) 3-10% by weight of nickel, c) 0.1-5% by weight of molybdenum, d) 0-0.5% by weight of nitrogen and e) 0-0.1% by weight of carbon. The chromium content is more preferably between 20 and 26% by weight, the molybdenum content between 2.0 and 4.5% by weight, the nitrogen content between 0.08 and 0.5% by weight, and the carbon content not more than 0.05% by weight.

In a further advantageous embodiment, at least one further element selected from the group consisting of copper, manganese, titanium, tungsten, tantalum, silicon and/or mixtures thereof is added to the alloy. In this case, the content of the at least one further element is especially between 0.1 and 8.0% by weight. It is most preferable when the steel is selected from the group consisting of steel materials having materials number 1.4462 (standard duplex steel X2CrNiMoN22-5-3), 1.4410 (superduplex steel X2CrNiMoN25-7-4).

In an alternative embodiment, the column may be a tray column. The tray column has cascade trays. Cascade trays are understood to mean trays arranged in the form of a cascade in the column. The column preferably has curved cascade trays. The water in the process according to the invention is introduced into the column preferably via these curved cascade trays. The curvature of the trays preferably extends over the entire diameter range of the trays. The cascade trays may be curved in the manner of a dish or of a sphere shell, the curvature being concave when viewed from above. In the case of dish-shaped curvature, the cascade trays have radii of curvature which can vary over the diameter range of the trays. In the case of curvature in the form of a sphere shell, the radius of curvature is constant over the diameter range of the trays. The cascade trays preferably have a continuous surface, meaning that there are no passage holes, valves or bubble caps in or on these trays.

The process according to the invention is advantageous especially because the associated petroleum gas, after performance of the process according to the invention, can be fed into the boiler of the downstream heating plant without any relevant shift in quality. In this way, it is possible to utilize plants already present in the periphery of the mineral oil production, and so the process according to the invention is particularly economically viable. In contrast, if inert stripping gas such as nitrogen were to be used, additional apparatus complexity would be necessary to remove the aromatic hydrocarbons from the stripping gas before the aromatic hydrocarbons can be combusted with a low level of emissions. Therefore, the use of associated petroleum gas as stripping gas does not create any additional product stream which has to be disposed of in a costly and inconvenient manner. It is possible to use the installations already present for transport and for incineration of the associated petroleum gas.

The process according to the invention is executed in a plant comprising, as well as a column (1), further equipment in the periphery thereof. A countercurrent heat exchanger (4) and a deposit water peak preheater (3) are utilized to bring the deposit water to a sufficient temperature, for example a temperature of 70° C., before it is introduced into the column (1). The cleaned deposit water, before being used any further, is cooled back to lower temperatures, for example temperatures of 30° C. to 40° C., by using an air cooler (8) of large dimensions. At high outside air temperatures, a further active cooling system (7) with heat exchanger (9) may be required. For example, the recooling of the deposit water can be effected by means of a deposit water recooling heat exchanger (4), in which case stream (III) with elevated temperature is utilized for preheating of deposit water which is introduced into the column (1) later on. In addition, the plant has a boiler (6) which can be operated with associated petroleum gas and serves to preheat the deposit water.

LIST OF REFERENCE NUMERALS

FIG. 1
1 Column
2 Gas displacement line
3 Peak preheater
4 Countercurrent heat exchanger
5 Associated petroleum gas feed
6 Boiler
7 Cooling system
8 Cooler
9 Heat exchanger

EXAMPLE

In a continuous column having random packing, several experiments are conducted with deposit water which is supplied in an amount of 30 000 l/h and has a BTEX concentration of 2.8 mg/l. In countercurrent to the deposit water, associated petroleum gas is conducted upward in the column as stripping medium. This by-product of wet oil processing comprises 49% by volume of methane, 12% by volume of ethane, 14% by volume of propane, 9% by volume of butanes, 3% by volume of pentanes and 2% by volume of hexanes and higher homologs and also 3% by volume of nitrogen and 7% by volume of carbon dioxide. The stripping operation is effected without column reflux, at internal column temperature 70° C. and at absolute pressure 1.020 bar (1020 hPa). The processed deposit water leaves the column at the bottom, and the BTEX-enriched and steam-saturated associated petroleum gas at the top.

After the stripping, the BTEX load on the deposit water is considerably reduced and is now only 0.3 to 0.5 mg/l. The values were determined by proper sampling of the deposit water and subsequent analysis by DIN method 38407 part 9 "Determination of Benzene and Some of Its Derivatives by Gas Chromatography".

The invention claimed is:
1. A process for workup of water comprising aromatic hydrocarbons selected from the group consisting of benzene, toluene, ethylbenzene, xylene, and combinations thereof, said process comprising:
(i) introducing a stream (I) comprising water and the aromatic hydrocarbons into a column,
(ii) contacting stream (I) with a second stream (II) in countercurrent and
(iii) removing a third stream (III) comprising water and at least some of the aromatic hydrocarbons, the aromatic hydrocarbons being present in a concentration of ≤3 mg/l based on the volume of stream (III),
wherein the second stream (II) comprises associated petroleum gas comprising ≥30% by volume to ≤75% by volume of methane;
wherein the water in step (i) has a temperature in the range of ≥40° C. to ≤80° C.; and
wherein a pressure in the range of ≥200 hPa to ≤1500 hPa is present in the column.
2. The process according to claim 1, wherein the aromatic hydrocarbons are present in the third stream (III) in a concentration of ≤1 mg/l based on the volume of stream (III).
3. The process according to claim 1, wherein the associated petroleum gas comprises ≥50% by volume to ≤97% by volume of $C_1$-$C_{10}$ hydrocarbons, based on the overall composition of the associated petroleum gas.
4. The process according to claim 3, wherein the $C_1$-$C_{10}$ hydrocarbons are selected from the group consisting of methane, ethane, propane, butane, pentane, hexane, heptane, octane, nonane and decane.
5. The process according to claim 3, wherein the associated petroleum gas comprises ≥50% by volume to ≤97% by volume of $C_1$-$C_6$ hydrocarbons, based on the overall composition of the associated petroleum gas.
6. The process according to claim 5, wherein the $C_1$-$C_6$ hydrocarbons are selected from the group consisting of methane, ethane, propane, butane, pentane and hexane.
7. The process according to claim 1, wherein the water in step (i) has a pH in the range of ≥4 to ≤6.5.
8. The process according to claim 1, wherein the column is a column having random packing.
9. The process according to claim 1, which is operated continuously.
10. The process according to claim 1, wherein the water is deposit water.
11. The process according to claim 1, wherein stream (I) comprises the aromatic hydrocarbons in a concentration of ≥2 mg/l to ≤700 mg/l, based on the volume of stream (I).
12. The process according to claim 1, wherein the associated petroleum gas comprises ≥50% by volume to ≤97% by volume of $C_1$-$C_6$ hydrocarbons, ≥2% by volume to ≤12% by volume of nitrogen and ≥0.5% by volume to ≤20% by volume of carbon dioxide.
13. The process according to claim 1, wherein the associated petroleum gas includes aromatic hydrocarbons selected from the group consisting of benzene, toluene, ethylbenzene, xylene, and combinations thereof in an amount of ≥0.01% by volume to ≤0.1% by volume.
14. The process according to claim 1, wherein the associated petroleum gas comprises ≥30% by volume to ≤65% by volume of methane.
15. A process for workup of water comprising aromatic hydrocarbons selected from the group consisting of benzene, toluene, ethylbenzene, xylene, and combinations thereof, said process comprising:
(iv) introducing a stream (I) comprising water and the aromatic hydrocarbons into a column,
(v) contacting stream (I) with a second stream (II) in countercurrent and
(vi) removing a third stream (III) comprising water and at least some of the aromatic hydrocarbons, the aromatic hydrocarbons being present in a concentration of ≤3 mg/l based on the volume of stream (III),
wherein the second stream (II) comprises associated petroleum gas comprising:
≥30% by volume to ≤75% by volume of methane;
≥5% by volume to ≤20% by volume of ethane;
≥5% by volume to ≤25% by volume of propane;
≥5% by volume to ≤25% by volume of butane;
≥1% by volume to ≤6% by volume of pentane; and
≥1% by volume to ≤5% by volume of hexane.

16. The process according to claim 15, wherein:
the water in step (i) has a temperature in the range of ≥40° C. to ≤80° C.; and
a pressure in the range of ≥200 hPa to ≤1500 hPa is present in the column.

* * * * *